United States Patent
Yabuzaki

(10) Patent No.: US 9,825,540 B2
(45) Date of Patent: Nov. 21, 2017

(54) SWITCHING POWER SUPPLY APPARATUS

(71) Applicant: FUJI ELECTRIC CO., LTD., Kawasaki-shi, Kanagawa (JP)

(72) Inventor: Jun Yabuzaki, Taipei (TW)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/363,413

(22) Filed: Nov. 29, 2016

(65) Prior Publication Data

US 2017/0201181 A1 Jul. 13, 2017

(30) Foreign Application Priority Data

Jan. 13, 2016 (JP) .................................. 2016-004652

(51) Int. Cl.
*H02M 3/335* (2006.01)
*H02M 1/32* (2007.01)
*H02M 1/36* (2007.01)
*H02M 1/12* (2006.01)

(52) U.S. Cl.
CPC ......... *H02M 3/33515* (2013.01); *H02M 1/12* (2013.01); *H02M 1/32* (2013.01); *H02M 1/36* (2013.01)

(58) Field of Classification Search
CPC ...... H02M 3/33515; H02M 1/12; H02M 1/32; H02M 1/36
See application file for complete search history.

(56) References Cited

U.S. PATENT DOCUMENTS

| 2010/0244800 A1* | 9/2010 | Nakamura | H02M 1/32 323/284 |
| 2014/0376273 A1* | 12/2014 | Hosotani | H02M 1/32 363/21.02 |
| 2015/0280585 A1* | 10/2015 | Hayakawa | H02M 3/33515 363/21.13 |
| 2015/0295488 A1* | 10/2015 | Shen | H02H 3/006 363/50 |
| 2016/0336847 A1* | 11/2016 | Kim | H02M 1/4258 |
| 2017/0012542 A1* | 1/2017 | Nishijima | H02M 3/33523 |
| 2017/0077825 A1* | 3/2017 | Yamane | H02M 3/33507 |

FOREIGN PATENT DOCUMENTS

JP 2009-153234 A 7/2009

* cited by examiner

*Primary Examiner* — Jue Zhang
*Assistant Examiner* — Lakaisha Jackson
(74) *Attorney, Agent, or Firm* — Rabin & Berdo, P.C.

(57) ABSTRACT

An overcurrent protection control circuit detects a low set value of an output voltage from a drop in voltage at a VCC terminal below a reference voltage. The overcurrent protection control circuit switches an overcurrent limit value from a high reference voltage to a low reference voltage and switches a maximum limit value of a switching frequency from a high first maximum switching frequency to a low second maximum switching frequency. By doing so, an overcurrent limit value of a switching element and a maximum limit value of a switching frequency are set to low values and a rise in output current is suppressed.

10 Claims, 10 Drawing Sheets

SWITCHING POWER SUPPLY APPARATUS

CROSS-REFERENCE TO RELATED APPLICATION

This application is based upon and claims the benefit of priority of the prior Japanese Patent Application No. 2016-004652, filed on Jan. 13, 2016, the entire contents of which are incorporated herein by reference.

BACKGROUND OF THE INVENTION

1. Field of the Invention

The embodiment discussed herein is related to a switching power supply apparatus and, more particularly, to a switching power supply apparatus having the function of switching an output voltage and outputting an output voltage after switching and having an overcurrent limiting function.

2. Background of the Related Art

Switching power supply apparatuses convert a commercial AC voltage to a DC voltage having any voltage value and output the DC voltage. Switching power supply apparatuses also accommodate a wide input voltage range. With flyback switching power supply apparatuses an output voltage is insulated from an input commercial source voltage. Flyback switching power supply apparatuses having the function of switching an output voltage and outputting an output voltage after switching and having an overcurrent limiting function are known (see, for example, Japanese Laid-open Patent Publication No. 2009-153234). A switching power supply apparatus having these functions will now be described.

FIG. 9 is a circuit diagram illustrative of a typical example of the structure of a flyback switching power supply apparatus 100. FIG. 10 indicates operational waveforms of important parts of the flyback switching power supply apparatus 100. In the following description the same numeral may be used for representing the name of a terminal and a voltage, a signal, or the like at the terminal.

This switching power supply apparatus includes a control IC 108 for pulse width modulation (PWM) control, which is a control circuit, and includes at least a transformer T, a switching element 17, a diode 19, and a capacitor 20 illustrated in FIG. 9. In this example, a metal oxide semiconductor field effect transistor (MOSFET) is used as the switching element 17. In the following description the switching element 17 is a MOSFET 17.

A voltage of a commercial AC source 1 is supplied to a diode bridge 4 via a common-mode choke coil 2 and an X capacitor 3 included in an input noise filter, and is full-wave-rectified by the diode bridge 4.

A capacitor 5 is connected between an output of the diode bridge 4 and ground and has the function of holding an input voltage for stably supplying energy to an output and the function of absorbing switching noise generated by the switching operation of the MOSFET 17. Furthermore, diodes 6 rectify the voltage of the AC source 1 and supply the voltage to a VH terminal of the control IC 108 via a current limiting resistor 7. The diodes 6 ensure the supply of a source voltage to the control IC 108 at start time. The current limiting resistor 7 limits a current flowing from the AC source 1 to the VH terminal in an emergency such as when a short circuit occurs between the VH terminal and the ground.

A thermistor 9 is connected to a LAT terminal of the control IC 108. When abnormal heat generation of the switching power supply apparatus occurs, the thermistor 9 detects it and provides overheat latch protection to the control IC 108. In addition, a CS terminal of the control IC 108 is connected to a sense resistor 12 via a noise filter including a capacitor 10 and a resistor 11.

A VCC terminal of the control IC 108 is connected to one end of a capacitor 13 and is connected to an auxiliary winding 15 of the transformer T via a diode 14. The capacitor 13 accumulates a starting current supplied at start time from the VH terminal and smooths a voltage supplied from the auxiliary winding 15 and rectified by the diode 14 at PWM control operation time after start. A voltage obtained by accumulating this starting current or a voltage obtained by smoothing the voltage supplied from the auxiliary winding 15 and rectified by the diode 14 is a source voltage of the control IC 108.

One end of a primary winding 16 of the transformer T is connected to the capacitor 5 and the other end of the primary winding 16 of the transformer T is connected to a drain terminal of the MOSFET 17. Furthermore, a source terminal of the MOSFET 17 is grounded via the sense resistor 12. The sense resistor 12 converts an ON-state current of the MOSFET 17 to a voltage signal whose magnitude is proportional to the ON-state current of the MOSFET 17. This voltage signal (current detection signal) is inputted to the CS terminal of the control IC 108 via the noise filter including the capacitor 10 and the resistor 11.

One end of a secondary winding 18 of the transformer T is connected to an anode of the diode 19. A cathode of the diode 19 is connected to one end of the capacitor 20 and an output terminal of the switching power supply apparatus. The other end of the secondary winding 18 of the transformer T is connected to the other end of the capacitor 20 and is grounded. A voltage across terminals of the capacitor 20 is an output voltage supplied to a load. Information regarding this voltage is transmitted from the secondary side to the primary side by a photocoupler 21. A light emitting diode (LED) of the photocoupler 21, a current limiting resistor 22, and two Zener diodes 23 and 24 are connected in series. Both ends of this series circuit are connected to the terminals of the capacitor 20. A collector terminal of a phototransistor of the photocoupler 21 is connected to a FB terminal of the control IC 108. An emitter terminal of the phototransistor of the photocoupler 21 is grounded. As a result, a current proportional to an output voltage on the secondary side (current which is a linear function of an output voltage on the secondary side, more precisely) is converted to an optical signal by the LED. The optical signal is transmitted to the phototransistor and is photoelectric-converted to a signal by the phototransistor. This signal is transmitted to the FB terminal of the control IC 108.

A switch 25 and one (Zener diode 24) of the Zener diodes 23 and 24 connected in series are connected in parallel. The switch 25 is on-off controlled by a standby signal supplied from the load. When the load operates in a normal state, off(open) control of the switch 25 is exercised by a standby signal. When the load is in a standby state, on(close) control of the switch 25 is exercised by a standby signal.

With the switching power supply apparatus using the control IC 108 for PWM control, a voltage obtained by rectifying an input AC voltage is converted to a determined DC voltage via the transformer T by controlling the switching operation of the MOSFET 17.

The control IC 108, which is an IC, detects information regarding a voltage outputted to the load on the secondary side of the transformer T by a signal fed back in the above way to the FB terminal of the control IC 108 via the photocoupler 21.

When the load operates in the normal state, the switch 25 is off-controlled by a standby signal supplied from the load. As a result, a current flowing through the LED is determined by a voltage obtained by subtracting the sum of a forward voltage of the LED, a breakdown voltage of the Zener diode 23, and a breakdown voltage of the Zener diode 24 from an output voltage and the resistance value of the current limiting resistor 22, and is fed back to the FB terminal of the control IC 108. On the other hand, when the load is in the standby state in which only part of the load functions, the switch 25 is on-controlled. As a result, a current flowing through the LED is determined by a voltage obtained by subtracting the sum of a forward voltage of the LED and a breakdown voltage of the Zener diode 23 from an output voltage and the resistance value of the current limiting resistor 22, and is fed back to the FB terminal of the control IC 108. At this time the current flowing through the LED is larger than the current flowing through the LED at the time of the load being in the normal state. Accordingly, the control IC 108 determines that an output voltage is high, and exercises control so as to decrease the output voltage. That is to say, the output voltage is switched to a low voltage and the low voltage is outputted.

Furthermore, the switching power supply apparatus has an overcurrent limiting function. That is to say, if an output power to an output on the secondary side becomes excessively high or if the load is short-circuited, the switching power supply apparatus limits an output power. This overcurrent limiting function is based on a signal which is obtained by converting a drain current flowing through the MOSFET 17 placed on the primary side to a voltage value by the sense resistor 12 connected to the source terminal and which is inputted to the CS terminal of the control IC 108. That is to say, when a voltage value obtained by the sense resistor 12 becomes equal to or greater than a threshold, the control IC 108 changes a gate voltage of the MOSFET 17 from a high (H) level to a low (L) level. By doing so, the control IC 108 exercises control so as to prevent the drain current from becoming equal to or greater than a certain value. This overcurrent limiting function not only prevents damage to a part of the switching power supply apparatus but also prevents a part of the switching power supply apparatus from emitting smoke or producing fire.

The control IC 108 determines an output signal outputted from an OUT terminal by comparing a voltage at the FB terminal and a voltage at the CS terminal directly or indirectly. This output signal controls the on-width of the MOSFET 17. As a result, PWM control of the switching power supply apparatus is exercised. By doing so, power supplied to the load on the secondary side is adjusted.

The above operation of the switching power supply apparatus will be described by reference to the operational waveforms indicated in FIG. 10. In FIG. 10, output power Pout, an output voltage Vout, an output current Iout, a voltage vcc at the VCC terminal of the control IC 108, a signal fb at the FB terminal of the control IC 108, a switching frequency Fsw, and a signal cs at the CS terminal of the control IC 108 are indicated in order from the top.

First it is assumed that the load operates in the normal state and that control is exercised so as to set the output voltage Vout of the switching power supply apparatus to, for example, 20 volts (V). At this time the load undertakes preparation for the standby state. As the output current Iout decreases, the peak values of the output power Pout, the signal fb, the switching frequency Fsw, and the signal cs gradually decrease. When the output power Pout and the output current Iout decreases further, the peak values of the signal fb, the switching frequency Fsw, and the signal cs also decrease further. The load goes into the standby state (switch 25 is on-controlled) at time a. At this time control is exercised so as to change the output voltage Vout from 20 V to 10 V. The switching frequency Fsw decreases to a value at which the voltage vcc for maintaining the operation of the control IC 108 is obtained.

The load then undertakes preparation for returning to the normal state. As the output current Iout and the output power Pout increase, the peak values of the signal fb, the switching frequency Fsw, and the signal cs gradually increase. When the output current Iout reaches a maximum value, the peak values of the signal fb, the switching frequency Fsw, and the signal cs also reach maximum values. When the switching frequency Fsw is a maximum limit value fswmax of the maximum switching frequency, the peak value of the signal cs is limited by an overcurrent limit threshold Vthocp. After that, notice to the effect that the load returns from the standby state to the normal state is given (switch 25 is off-controlled) at time b. At this time control is exercised so as to change the output voltage Vout from 10 V to 20 V.

With switching power supply apparatus of a type which perform switching among two or more output voltages and output an output voltage after the switching, however, the following problem arises. If an overcurrent limit threshold and a maximum switching frequency are constant regardless of an output voltage, an output current value at the time of limiting an overcurrent depends on the magnitude of the output voltage. In the example of FIG. 9, when an output voltage is low (Vout=10 V) (especially during time t), an output current is large (Iout=6.4 amperes (A)). When an output voltage is high (Vout=20 V), an output current is small (Iout=4.4 amperes (A)). Maximum power supplied from the primary side to the secondary side of a transformer is determined regardless of an output voltage. Accordingly, when an output voltage is low, an output current is large. As a result, parts may be selected in accordance with an output current value at the time of an output voltage being low. In particular, a diode on the secondary side, a secondary winding of a transformer, and the like are selected in accordance with a large output current value. However, an output voltage is decreased for the purpose of reducing power consumption in the case of, for example, an apparatus, which is a load, stopping its operation. If an apparatus, which is a load, stops its operation, in many cases operation performed does not need high output power. Originally there is no need to select parts on the assumption that overcurrent operation is performed at the time of decreasing an output voltage. As has been described, with conventional switching power supply apparatus of a type which perform switching among two or more output voltages and output an output voltage after the switching, parts may be selected in accordance with a large output current flowing at the time of an output voltage being low. This is a great waste.

SUMMARY OF THE INVENTION

According to an aspect, there is provided a switching power supply apparatus which generates, by performing switching of a switching element connected to a DC voltage via a primary winding of a transformer, an output DC voltage on a secondary winding side of the transformer and which exercises control so as to make the output voltage constant by feeding back an output voltage signal corresponding to the generated output voltage to a primary side of the transformer, including an oscillation circuit which generates a signal for performing switching of the switching element, an output voltage switching circuit which switches the output voltage to a first output voltage or a second output voltage lower than the first output voltage by handling the output voltage signal, and an overcurrent protection circuit which limits a principal current flowing through the switching element to an overcurrent limit value, the overcurrent protection circuit setting the overcurrent limit value to a first overcurrent limit value at the time of the output voltage being switched to the first output voltage and setting the overcurrent limit value to a second overcurrent limit value lower than the first overcurrent limit value at the time of the output voltage being switched to the second output voltage, the oscillation circuit setting a maximum limit value of a switching frequency to a first maximum switching frequency at the time of the overcurrent limit value being the first overcurrent limit value and setting the maximum limit value of the switching frequency to a second maximum switching frequency lower than the first maximum switching frequency at the time of the overcurrent limit value being the second overcurrent limit value.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
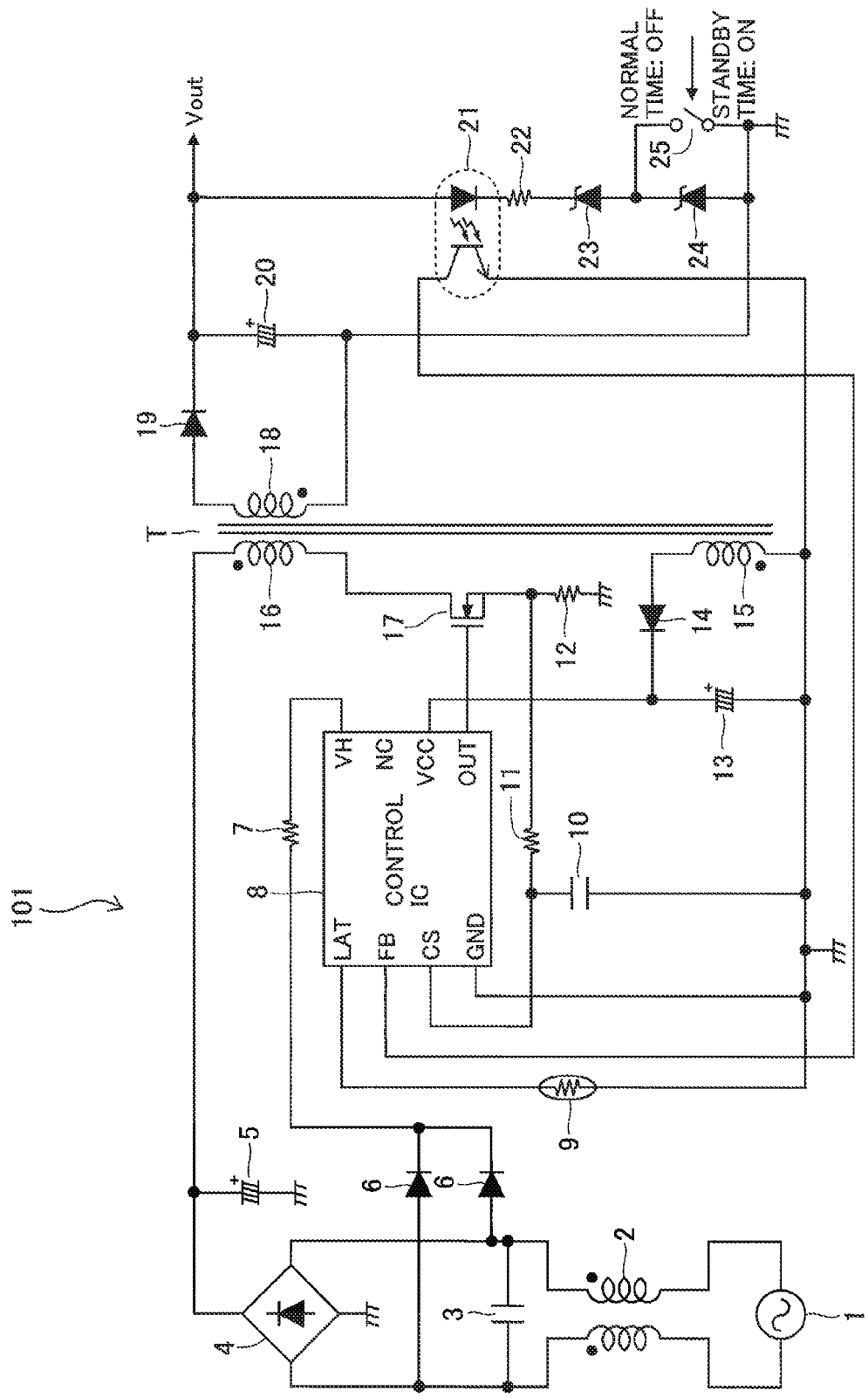
FIG. 1 is a circuit diagram illustrative of a flyback switching power supply apparatus according to one embodiment.
Figure 9:
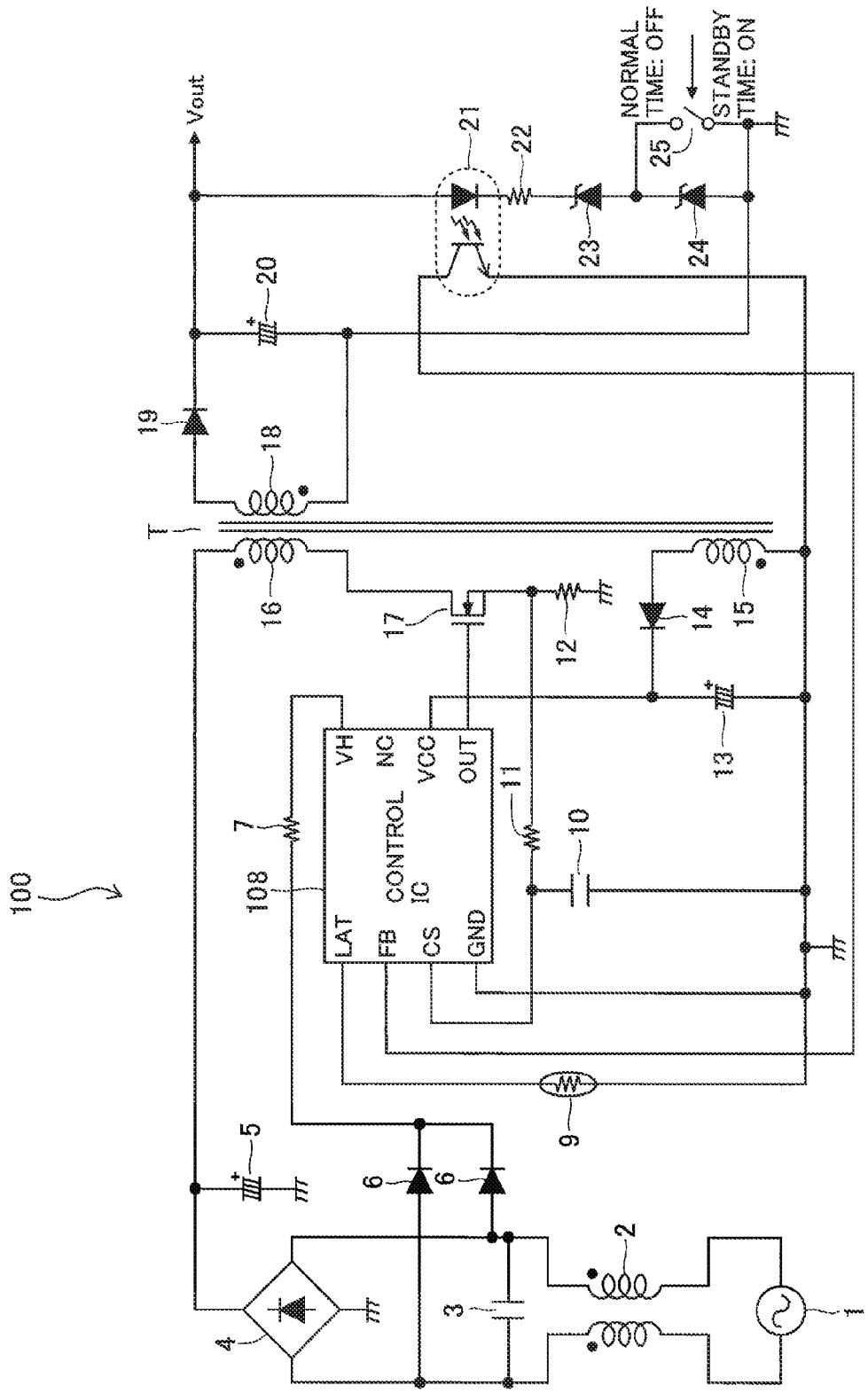
FIG. 9 is a circuit diagram illustrative of a typical example of the structure of a flyback switching power supply apparatus.
Figure 10:
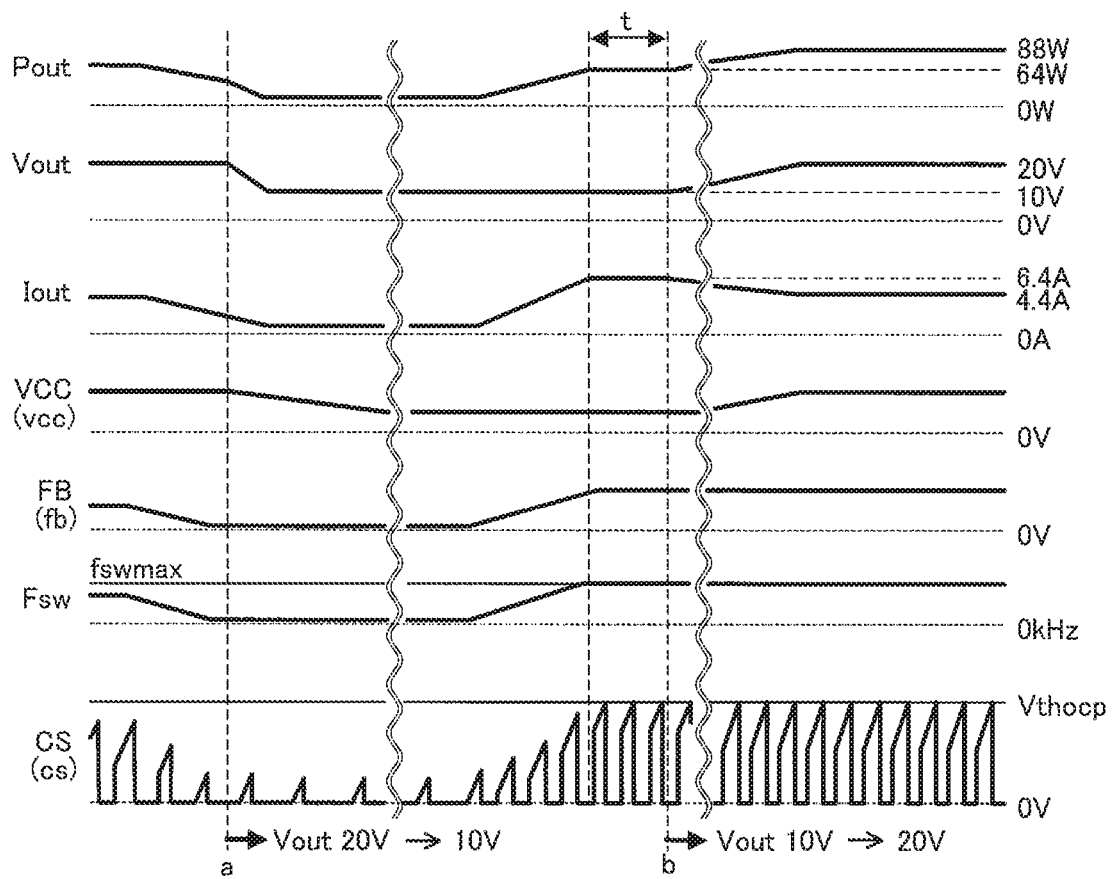
FIG. 10 indicates operational waveforms of important parts of the flyback switching power supply apparatus.

An embodiment will now be described in detail with reference to the accompanying drawings. The structure of a switching power supply apparatus 101 is similar to the circuit diagram of FIG. 9. However, the switching power supply apparatus 101 of FIG. 1 includes a control IC 8 having a different internal structure than that of FIG. 9. Accordingly, components of FIG. 1 that are the same as in FIG. 9 will not be described further here.

Figure 2:
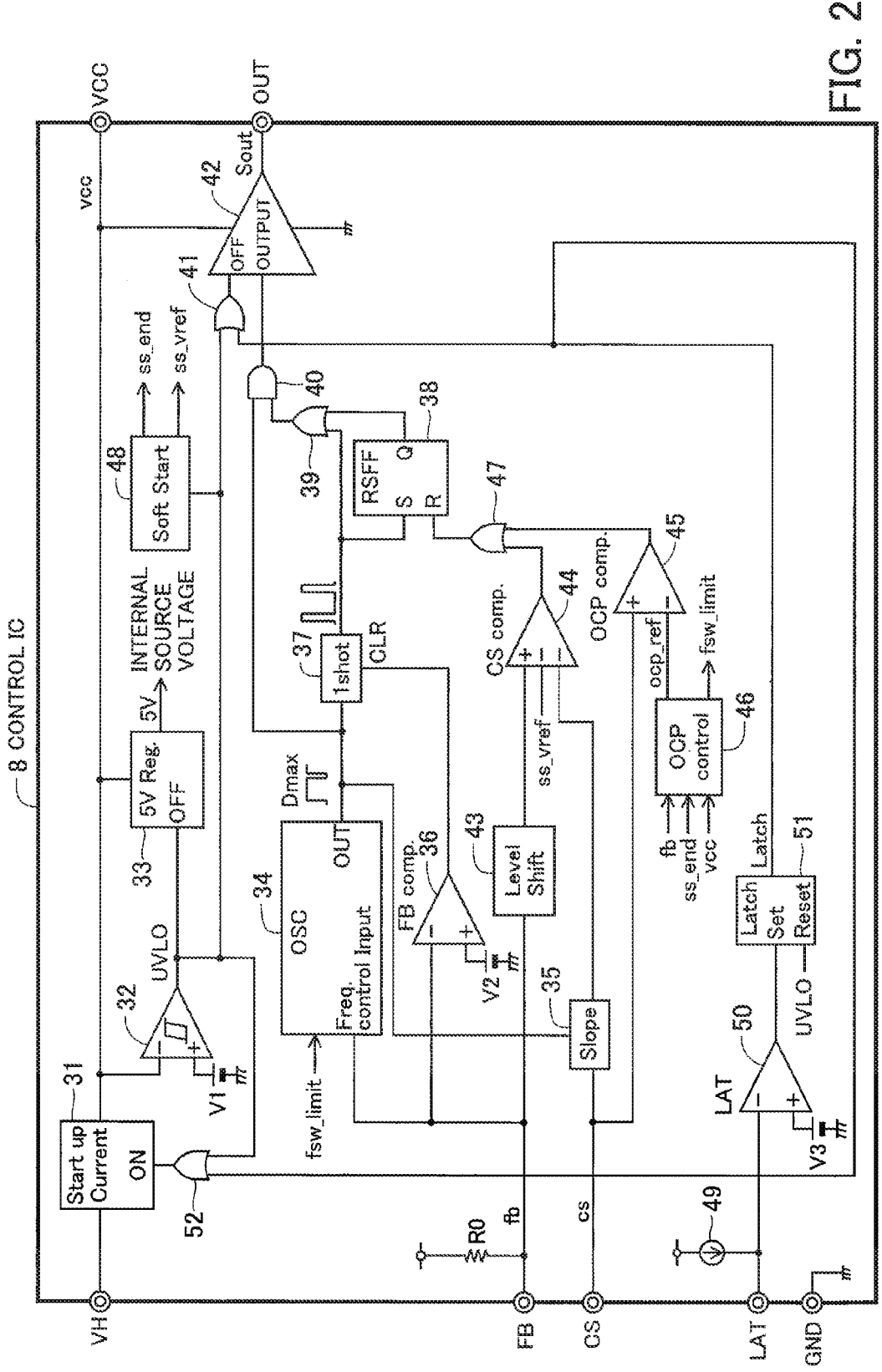
FIG. 2 is a block diagram illustrative of an example of the circuit structure of a control IC of a switching power supply apparatus according to an embodiment.

FIG. 2 is a block diagram illustrative of an example of the circuit structure of a control IC 8 of a switching power supply apparatus according to an embodiment.

A start-up circuit 31 in the control IC 8 supplies a current at start time from a VH terminal to a VCC terminal. When a voltage of an AC source 1 is applied, a current flows from the VH terminal, through the start-up circuit 31, to the VCC terminal in the control IC 8. As a result, a capacitor 13 externally connected to the VCC terminal is charged. A smoothed voltage vcc is used as a source voltage of the control IC 8 at start time.

A low-voltage malfunction prevention circuit (UVLO) 32 is connected to the VCC terminal and a reference source V1. When a voltage value at the VCC terminal becomes equal to or higher than a voltage of the reference source V1, a signal UVLO, which is an output of the low-voltage malfunction prevention circuit 32, becomes an L level and an internal source circuit 33 starts and supplies a source voltage to each circuit in the control IC 8. To the contrary, while a voltage value at the VCC terminal is low, the low-voltage malfunction prevention circuit 32 makes the signal UVLO an H level to stop the operation of the control IC 8.

An oscillator (OSC) 34 is connected to an FB terminal and has the function of receiving a signal fb and lowering an oscillation frequency at the time of a load being light. Furthermore, the oscillator 34 has the function of receiving a signal fsw_limit and performing switching between two maximum switching frequencies. The oscillator 34 outputs an oscillating signal (duty max signal) Dmax.

The oscillating signal Dmax is at an H level for a long period and is at an L level only for a short period every cycle. The cycle of the oscillating signal Dmax is the switching cycle of the switching power supply apparatus. The ratio of a period in the cycle for which the oscillating signal Dmax is at an H level to the cycle is the maximum time ratio (duty max) of the switching power supply apparatus. In addition, a slope compensation circuit 35 is connected to a CS terminal and has the function of receiving a signal cs and preventing subharmonic oscillation described later.

Input terminals of an FB comparator 36 are connected to the FB terminal and a reference source V2. When a signal fb at the FB terminal becomes lower than a voltage of the reference source V2, the FB comparator 36 determines that load power is low. The FB comparator 36 outputs a clear signal CLR at an H level to a one-shot circuit 37 at the subsequent stage to stop the operation of the one-shot circuit 37. By doing so, the FB comparator 36 stops the switching operation. Furthermore, when the signal fb at the FB terminal becomes higher than the voltage of the reference source V2, the FB comparator 36 makes the switching operation begin. By doing so, the FB comparator 36 temporarily stops the switching operation at the time of the load being light. That is to say, the FB comparator 36 realizes burst operation.

The one-shot circuit 37 is triggered by the rising of the oscillating signal Dmax outputted from the oscillator 34 and generates a set pulse for an RS flip-flop 38 at the subsequent stage. Furthermore, this set pulse also functions as a blanking signal for preventing erroneous turn-off of a MOSFET 17 caused by noise generated at the CS terminal at the time of the MOSFET 17 turning on. While the clear signal CLR at an H level is being inputted to the one-shot circuit 37, the one-shot circuit 37 does not output a set pulse to the RS flip-flop 38.

The RS flip-flop 38, together with an OR gate 39 and an AND gate 40, generates a PWM signal. That is to say, the OR gate 39 generates an OR signal of an output signal of the one-shot circuit 37 and an output signal of the RS flip-flop 38 inputted thereto.

Basically, an output signal of the OR gate 39 is a PWM signal. Furthermore, the AND gate 40 determines the maximum duty of the PWM signal on the basis of the oscillating signal Dmax outputted from the oscillator 34.

The signal UVLO outputted from the low-voltage malfunction prevention circuit 32 is supplied to an OFF terminal of a drive circuit (OUTPUT) 42 via an OR gate 41 to control whether to permit the operation of the drive circuit 42. A switching signal Sout outputted from the drive circuit 42 via an OUT terminal is supplied to a gate terminal of the MOSFET 17 to exercise switching control. When the voltage vcc at the VCC terminal is low and the signal UVLO is at an H level, an output of the drive circuit 42 is off (drive circuit 42 outputs a signal for turning off the MOSFET 17). To the contrary, when the voltage vcc at the VCC terminal is high, the signal UVLO is at an L level, and an output signal of a latch circuit 51 is at an L level, the drive circuit 42 exercises switching control of the MOSFET 17 in accordance with an output signal of the AND gate 40.

A level shift circuit 43 has the function of level-shifting the signal fb at the FB terminal to a voltage range which can be inputted to a CS comparator 44. An output signal of the level shift circuit 43 is supplied to a non-inverting input terminal (+) of the CS comparator 44. An output signal of the slope compensation circuit 35 and a soft start reference voltage ss_vref are supplied to inverting input terminals (−) of the CS comparator 44. An internal source is connected to the FB terminal via a resistor R0 and the resistor R0 is the load resistance (pull-up resistance) of a phototransistor included in a photocoupler 21. Accordingly, the magnitude of an error signal, which is the difference between an output voltage Vout applied to the load connected to the switching power supply apparatus and a reference voltage determined on the basis of an LED and Zener diodes 23 and 24, is detected by a voltage drop by the resistor R0 from the source voltage supplied from the internal source circuit 33. The error signal having a smaller value means a heavier load. In this case, the voltage of the signal fb at the FB terminal increases.

The CS comparator 44 compares one of a voltage at the CS terminal after slope compensation and the soft start reference voltage ss_vref which is lower than the other and a voltage at the FB terminal after a level shift. If the CS comparator 44 determines that the voltage at the FB terminal is higher than the voltage at the CS terminal or the soft start reference voltage ss_vref, then the CS comparator 44 outputs a signal at an H level that determines timing at which the MOSFET 17 is turned off.

Furthermore, the CS terminal of the control IC 8 is connected to an OCP comparator 45 which determines an overcurrent detection level of the MOSFET 17. A non-inverting input terminal (+), an inverting input terminals (−), and an output of the OCP comparator 45 are connected to the CS terminal, an overcurrent protection control circuit 46, and an OR gate 47 respectively. The OCP comparator 45 detects an overcurrent of the MOSFET 17. When an input voltage to the non-inverting input terminal (+) becomes equal to or higher than an input voltage to the inverting input terminals (−), the OCP comparator 45 outputs a signal at an H level that determines timing at which the MOSFET 17 is turned off.

The voltage vcc at the VCC terminal, the signal fb at the FB terminal, and a soft start end signal ss_end are inputted to the overcurrent protection control circuit 46. The overcurrent protection control circuit 46 outputs a reference voltage ocp_ref with which the OCP comparator 45 compares the signal cs at the CS terminal and a signal fsw_limit to be supplied to the oscillator 34.

An output signal of the CS comparator 44 and an output signal of the OCP comparator 45 are supplied to a reset terminal of the RS flip-flop 38 via the OR gate 47.

The soft start reference voltage ss_vref inputted to the CS comparator 44 and the soft start end signal ss_end inputted to the overcurrent protection control circuit 46 are outputted from a soft start circuit 48 which operates by receiving the signal UVLO outputted from the low-voltage malfunction prevention circuit 32.

A current source 49 is connected to a LAT terminal. A certain current is supplied to a thermistor 9 via the LAT terminal. A LAT comparator 50 is connected to the LAT terminal and a reference source V3 and compares a voltage at the LAT terminal (that is to say, a voltage at a terminal of the thermistor 9) and a voltage of the reference source V3. When the LAT comparator 50 detects that the voltage at the LAT terminal has become equal to or lower than the voltage of the reference source V3, the LAT comparator 50 determines that the switching power supply apparatus is in an overheated state, and outputs a set signal to the latch circuit 51.

The latch circuit 51 receives the set signal from the LAT comparator 50 and outputs a latch signal Latch at an H level to the OR gate 41 and an OR gate 52. As a result, the drive circuit 42 is turned off and the start-up circuit 31 is turned on. Furthermore, the signal UVLO outputted from the low-voltage malfunction prevention circuit 32 is supplied to a reset terminal of the latch circuit 51. When the voltage vcc at the VCC terminal drops, a latch state is released.

When the internal source circuit 33 starts and supplies a source voltage to each internal circuit, a voltage fb is applied to the phototransistor included in the photocoupler 21 via the resistor R0 and the FB terminal and a voltage at the FB terminal rises.

When the voltage fb at the FB terminal becomes equal to or higher than a certain voltage value, the oscillator 34 outputs the oscillating signal Dmax. The one-shot circuit 37 triggered by the rising of the oscillating signal Dmax outputs a set pulse to the RS flip-flop 38.

The set pulse, together with an output signal of the RS flip-flop 38, is inputted to the OR gate 39. An output signal of the OR gate 39 is a PWM signal. This PWM signal flows through the AND gate 40 and the drive circuit 42 and is supplied as the switching signal Sout from the OUT terminal to the gate terminal of the MOSFET 17. By doing so, the MOSFET 17 is driven.

Accordingly, the MOSFET 17 turns on with the rising of the oscillating signal Dmax. The RS flip-flop 38 is reset due to noise generated at the CS terminal at the time of the MOSFET 17 turning on. As a result, right after the MOSFET 17 turns on, the MOSFET 17 turns off. To avoid this, the output signal of the RS flip-flop 38 and the set pulse outputted from the one-shot circuit 37 are ORed.

When the MOSFET 17 turns on, a drain current flows through a sense resistor 12. As a result, the voltage of the signal cs at the CS terminal of the control IC 8 rises. When a voltage at the CS terminal slope-compensated by the slope compensation circuit 35 of the control IC 8 reaches a voltage obtained by level-shifting the signal fb at the FB terminal by the level shift circuit 43, the CS comparator 44 outputs a signal at an H level. This signal at the H level is supplied to the reset terminal of the RS flip-flop 38 via the OR gate 47.

The RS flip-flop 38 is reset by this signal. Accordingly, an output of the OR gate 39 becomes an L level (set pulse outputted from the one-shot circuit 37 becomes an L level at this point of time in the case of normal operation). As a result, an output of the AND gate 40 also becomes an L level. Accordingly, the MOSFET 17 is turned off by the switching signal Sout.

Furthermore, even when the load connected to the switching power supply apparatus becomes extremely heavy and the signal fb fed back to the FB terminal of the control IC 8 is beyond a control range on the high voltage side, the OCP comparator 45 monitors the signal cs at the CS terminal. When the value of the signal cs becomes equal to or higher than the value of the reference voltage ocp_ref, the OCP comparator 45 turns off the MOSFET 17.

Before the CS comparator 44 compares a voltage obtained by level-shifting the signal fb at the FB terminal with the signal cs at the CS terminal, the slope compensation circuit 35 performs slope compensation on the signal cs at the CS terminal. That is to say, the slope compensation circuit 35 adds to the signal cs at the CS terminal a slope compensation voltage proportional to the length of on-time of the MOSFET 17.

Usually the magnitude of a current flowing through the MOSFET 17 at the beginning of each switching cycle is constant if the MOSFET 17 operates in a steady state. However, if the duty (on-time ratio=on-width/switching cycle) of the MOSFET 17 is too large, the magnitude of the current is not constant. That is to say, the state of the current flowing through the MOSFET 17 varies every switching cycle. If this phenomenon occurs, the current flowing through the MOSFET 17 goes into a state in which a signal at a low frequency is superimposed on a signal at a switching frequency.

This oscillation at a low frequency is known as subharmonic oscillation. However, the subharmonic oscillation occurs under a condition. With the slope compensation a signal that monotonically increases is superimposed on the signal cs at the CS terminal. By performing the slope compensation, the condition is not met. Therefore, the subharmonic oscillation is prevented.

With the switching power supply apparatus the oscillator 34 of the control IC 8 generates the oscillating signal Dmax for performing switching operation of the MOSFET 17. 65 kHz, 25 kHz, and frequencies between them are used as typical frequencies. That is to say, when the load is heavy, the switching frequency is fixed at 65 kHz. As the load becomes lighter, the switching frequency is changed from 65 kHz to 25 kHz. When the switching frequency is decreased to 25 kHz, the switching frequency is fixed at 25 kHz and is not decreased to an audio frequency at which a transformer T produces a sound. As the load becomes lighter, the operating frequency is decreased in this way. This increases the efficiency of the switching power supply apparatus.

Furthermore, when the output voltage Vout is switched to a low voltage, the oscillator 34 of the control IC 8 changes a maximum limit value of a maximum switching frequency on the basis of the signal fsw_limit outputted from the overcurrent protection control circuit 46.

Concrete examples of the overcurrent protection control circuit 46 and the oscillator 34 of the control IC 8 will now be described.

Figure 3:
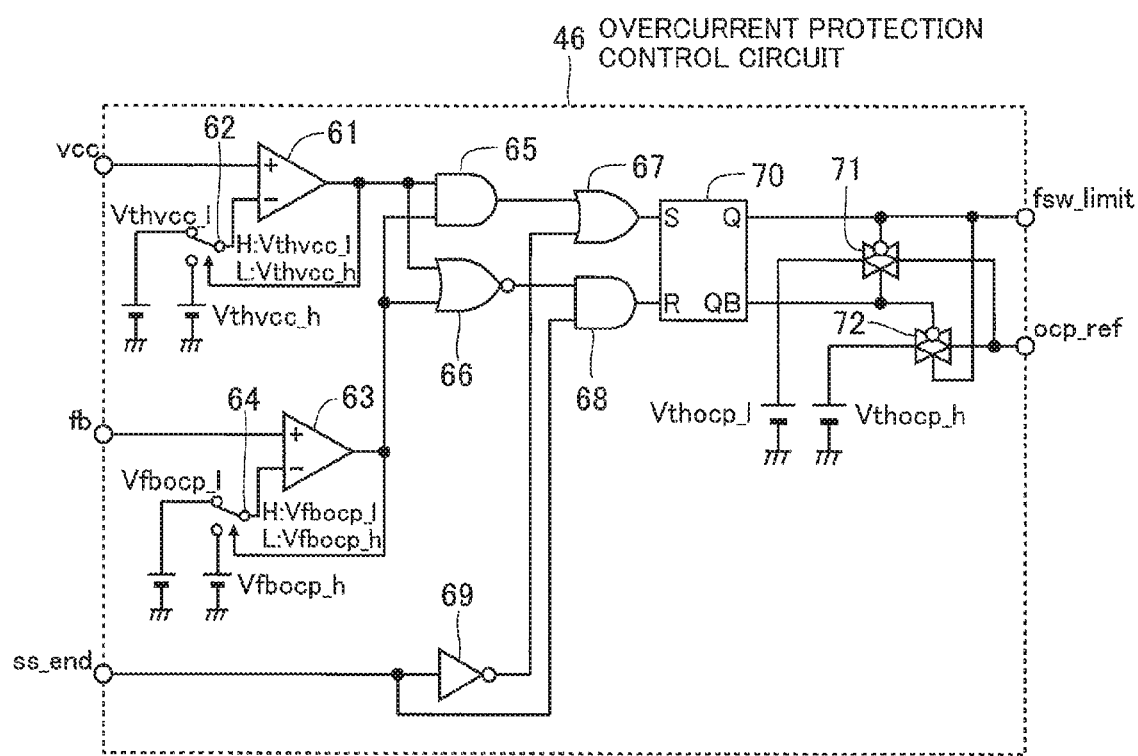
FIG. 3 is a circuit diagram illustrative of an example of the structure of an overcurrent protection control circuit.
Figure 4:
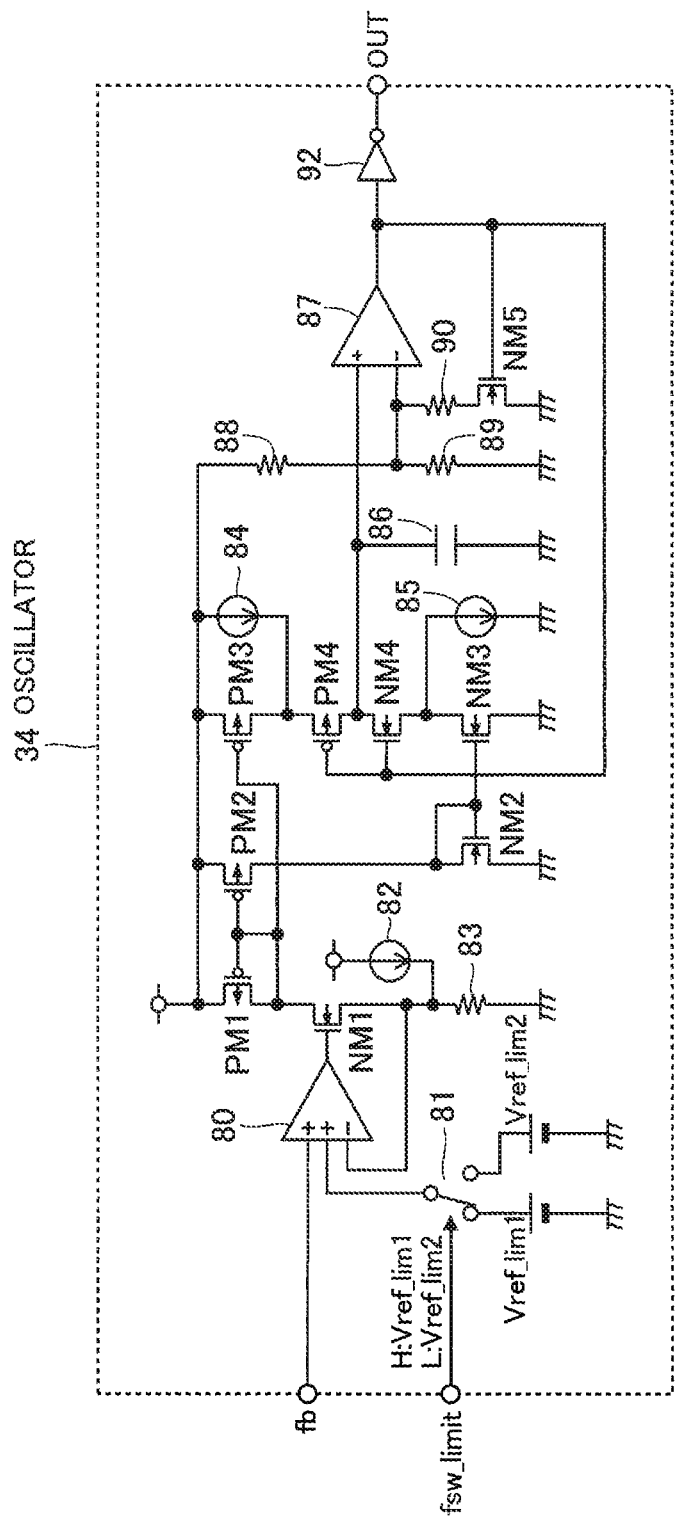
FIG. 4 is a circuit diagram illustrative of an example of the structure of an oscillator.
Figure 5:
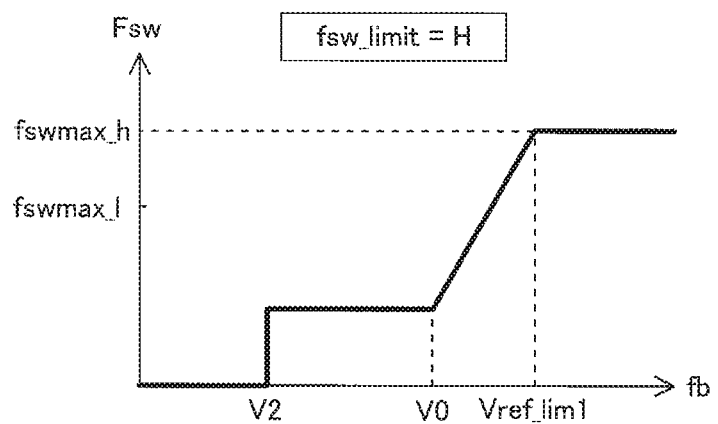
FIG. 5 indicates the relationship between a voltage at an FB terminal and a switching frequency at the time of a maximum switching frequency being set to a high value.
Figure 6:
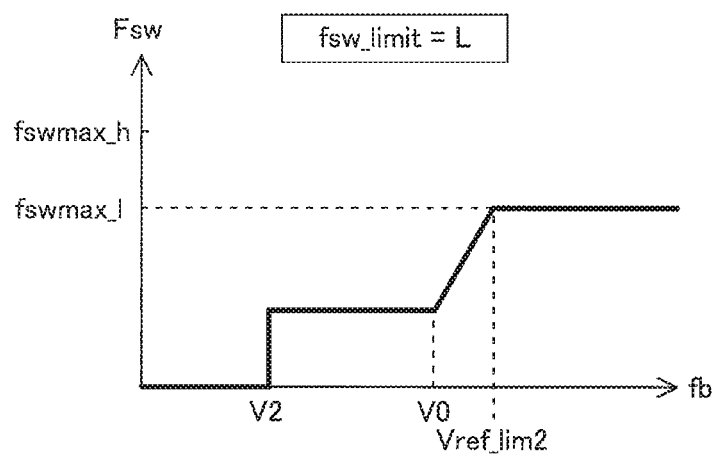
FIG. 6 indicates the relationship between a voltage at the FB terminal and a switching frequency at the time of a maximum switching frequency being set to a low value.

FIG. 3 is a circuit diagram illustrative of an example of the structure of the overcurrent protection control circuit 46. FIG. 4 is a circuit diagram illustrative of an example of the structure of the oscillator 34. FIG. 5 indicates the relationship between a voltage at the FB terminal and a switching frequency at the time of a maximum switching frequency being set to a high value. FIG. 6 indicates the relationship between a voltage at the FB terminal and a switching frequency at the time of a maximum switching frequency being set to a low value.

As illustrated in FIG. 3, the overcurrent protection control circuit 46 includes a comparator 61. The voltage vcc is inputted to a non-inverting input terminal of the comparator 61 and a reference voltage Vthvcc_1 and a reference voltage Vthvcc_h having different thresholds are inputted to an inverting input terminal of the comparator 61 via a switch 62. When an output of the comparator 61 is at an H level, the switch 62 inputs the reference voltage Vthvcc_1 to the inverting input terminal. When an output of the comparator 61 is at an L level, the switch 62 inputs the reference voltage Vthvcc_h higher than the reference voltage Vthvcc_1 to the inverting input terminal. By doing so, the comparator 61 is made a hysteresis comparator.

Furthermore, the overcurrent protection control circuit 46 includes a comparator 63. The signal fb is inputted to a non-inverting input terminal of the comparator 63 and a reference voltage Vfbocp_1 and a reference voltage Vfbocp_h having different thresholds are inputted to an inverting input terminal of the comparator 63 via a switch 64. When an output of the comparator 63 is at an H level, the switch 64 inputs the reference voltage Vfbocp_1 to the inverting input terminal. When an output of the comparator 63 is at an L level, the switch 64 inputs the reference voltage Vfbocp_h higher than the reference voltage Vfbocp_1 to the inverting input terminal. By doing so, the comparator 63 is made a hysteresis comparator.

An output of the comparator 61 is inputted to one input terminal of an AND gate 65 and one input terminal of a NOR gate 66. An output of the comparator 63 is inputted to the other input terminal of the AND gate 65 and the other input terminal of the NOR gate 66. An output of the AND gate 65 is inputted to one input terminal of an OR gate 67. An output of the NOR gate 66 is inputted to one input terminal of an AND gate 68. The soft start end signal ss_end is inputted to the other input terminal of the AND gate 68. The soft start end signal ss_end inverted by a NOT gate 69 is inputted to the other input terminal of the OR gate 67. An output of the OR gate 67 is inputted to a set terminal of an RS flip-flop 70. An output of the AND gate 68 is inputted to a reset terminal of the RS flip-flop 70. An output terminal Q of the RS flip-flop 70 outputs to the oscillator 34 the signal fsw_limit by which a maximum switching frequency is switched.

Furthermore, the output terminal Q of the RS flip-flop 70 is connected to a negative-logic control terminal of a transfer gate 71 and a positive-logic control terminal of a transfer gate 72. In addition, an output terminal QB of the RS flip-flop 70 is connected to a positive-logic control terminal of the transfer gate 71 and a negative-logic control terminal of the transfer gate 72. A reference voltage Vthocp_1 is inputted to an input terminal of the transfer gate 71. A reference voltage Vthocp_h is inputted to an input terminal of the transfer gate 72. Output terminals of the transfer gate 71 and the transfer gate 72 are connected to each other. The reference voltage Vthocp_1 or the reference voltage Vthocp_h is outputted to the OCP comparator 45 as the signal ocp_ref indicative of an overcurrent limit value, depending on the logic state of the signal fsw_limit.

The soft start end signal ss_end is at an L level for a period from the time when the switching power supply apparatus starts switching to the time when a soft start ends. At this time the soft start end signal ss_end puts the RS flip-flop 70 into a set state and makes the signal fsw_limit an H level.

After the soft start ends, the soft start end signal ss_end becomes an H level. Accordingly, the OR gate 67 inputs a set signal from the AND gate 65 to the RS flip-flop 70 and the AND gate 68 inputs a reset signal from the NOR gate 66 to the RS flip-flop 70.

The oscillator 34 is illustrated in FIG. 4. In FIG. 4, transistors PM1 through PM4 are p-channel MOSFETs and transistors NM1 through NM5 are n-channel MOSFETs.

The oscillator 34 includes an operational amplifier (OP amp.) 80. The signal fb is inputted to a first non-inverting input terminal of the operational amplifier 80. A reference voltage Vref_lim1 and a reference voltage Vref_lim2 having different thresholds are inputted to a second non-inverting input terminal of the operational amplifier 80 via a switch 81. Switching of the switch 81 is controlled by the signal fsw_limit outputted from the overcurrent protection control circuit 46. When the signal fsw_limit is at an H level, the reference voltage Vref_lim1 is applied to the second non-inverting input terminal of the operational amplifier 80. When the signal fsw_limit is at an L level, the reference voltage Vref_lim2 is applied to the second non-inverting input terminal of the operational amplifier 80. One of the first non-inverting input terminal and the second non-inverting input terminal to which a lower voltage is inputted becomes effective. The other to which a higher voltage is inputted has no relation with the operation of the operational amplifier 80. An output of the operational amplifier 80 is inputted to a gate terminal of the transistor NM1. A source terminal of the transistor NM1 is connected to an inverting input terminal of the operational amplifier 80, one end of a constant-current source 82, and one end of a resistor 83. Furthermore, the other end of the constant-current source 82 is connected to the internal source. The other end of the resistor 83 is grounded. A drain terminal of the transistor NM1 is connected to a drain terminal and a gate terminal of the transistor PM1. A source terminal of the transistor PM1 is connected to the internal source.

A gate terminal of the transistor PM1 is connected to a gate terminal of the transistor PM2. A source terminal of the transistor PM2 is connected to the internal source. Furthermore, the gate terminal of the transistor PM1 is connected to a gate terminal of the transistor PM3. A source terminal of the transistor PM3 is connected to the internal source. Therefore, the transistor PM1 and the transistor PM2 make up a first current mirror circuit and the transistor PM1 and the transistor PM3 make up a second current mirror circuit.

A drain terminal of the transistor PM2 is connected to a drain terminal and a gate terminal of the transistor NM2. A source terminal of the transistor NM2 is grounded. The gate terminal of the transistor NM2 is connected to a gate terminal of the transistor NM3. A source terminal of the transistor NM3 is grounded. Therefore, the transistor NM2 and the transistor NM3 make up a third current mirror circuit.

A drain terminal of the transistor PM3 is connected to a source terminal of the transistor PM4. Furthermore, the source terminal of the transistor PM4 is connected to one end of a constant-current source 84. The other end of the constant-current source 84 is connected to the internal source. A drain terminal of the transistor PM4 is connected to a drain terminal of the transistor NM4. A source terminal of the transistor NM4 is connected to a drain terminal of the transistor NM3. Furthermore, the drain terminal of the transistor NM3 is connected to one end of a constant-current source 85. The other end of the constant-current source 85 is grounded. The transistor PM4 functions as a switch for turning on or off a current flowing from the second current mirror circuit or the constant-current source 84. The transistor NM4 functions as a switch for turning on or off a current flowing to the third current mirror circuit or the constant-current source 85.

The drain terminals of the transistor PM4 and the transistor NM4 are connected to one end of a capacitor 86. The other end of the capacitor 86 is grounded. The one end of the capacitor 86 is connected to a non-inverting input terminal of a comparator 87. An inverting input terminal of the comparator 87 is connected to a common connection point of resistors 88 and 89 connected in series between the internal source and the ground and is connected to one end of a resistor 90. The other end of the resistor 90 is connected to a drain terminal of the transistor NM5. A source terminal of the transistor NM5 is grounded. The resistors 88 and 89 set an upper-limit threshold voltage at the time of the capacitor 86 being charged. The resistors 88, 89, and 90 and the transistor NM5 set a lower-limit threshold voltage at the time of the capacitor 86 being discharged.

An output terminal of the comparator 87 is connected to an OUT terminal of the oscillator 34 via a NOT gate 92. Furthermore, the output terminal of the comparator 87 is connected to the gate terminals of the transistors PM4, NM4, and NM5.

In the oscillator 34, the operational amplifier 80 amplifies the difference between one of the signal fb inputted to the first non-inverting input terminal and the reference voltage Vref_lim1 or the reference voltage Vref_lim2 inputted to the second non-inverting input terminal which is smaller in voltage value than the other and a voltage inputted to the inverting input terminal. A reference voltage inputted to the second non-inverting input terminal is switched by the signal fsw_limit outputted from the overcurrent protection control circuit 46.

When the voltage vcc is higher than a voltage inputted to the inverting input terminal of the comparator 61 and the signal fb is higher than a voltage inputted to the inverting input terminal of the comparator 63, the RS flip-flop 70 is set and the signal fsw_limit outputted from the overcurrent protection control circuit 46 becomes an H level. It is assumed that at this time the soft start end signal ss_end is at an H level (same applies to the following). When the signal fsw_limit is at an H level, the switch 81 inputs the reference voltage Vref_lim1 to the second non-inverting input terminal of the operational amplifier 80. As indicated in FIG. 5, at this time a maximum limit value fswmax of a switching frequency Fsw generated by the oscillator 34 is a first maximum switching frequency fswmax_h. On the other hand, when the voltage vcc is lower than a voltage inputted to the inverting input terminal of the comparator 61 and the signal fb is lower than a voltage inputted to the inverting input terminal of the comparator 63, the RS flip-flop 70 is reset and the signal fsw_limit outputted from the overcurrent protection control circuit 46 becomes an L level. When the signal fsw_limit is at an L level, the switch 81 inputs the reference voltage Vref_lim2 to the second non-inverting input terminal of the operational amplifier 80. As indicated in FIG. 6, at this time a maximum limit value fswmax of a switching frequency Fsw generated by the oscillator 34 is a second maximum switching frequency fswmax_1 lower than the first maximum switching frequency fswmax_h.

Switching of the RS flip-flop 70 may be performed only by the voltage vcc (that is to say, an output of the comparator 63 is not used and setting or resetting the RS flip-flop 70 is determined only by an output of the comparator 61). In that case, however, the following problems may arise. That is to say, when control is exercised so as to output a high output voltage Vout, the load may become excessively heavy or an output may be short-circuited. In this case, the voltage vcc drops and an overcurrent limit value is switched to a low value. Even when after that a load current returns to a normal range, the determination that an overcurrent is flowing is made. As a result, an output voltage does not rise. In addition, when control is exercised so as to output a low output voltage Vout, surge noise or the like may be applied from the outside to a power supply line of the load. In this case, the voltage vcc rises and an overcurrent limit value is switched to a high value. As a result, a larger current is passed through the load. This may cause damage to the load.

On the other hand, in this embodiment the signal fb which is hardly influenced by the above unexpected factors is also used (usually a delay element is disposed on a feedback line in order to stabilize a system (not illustrated in FIG. 1 or FIG. 2)). Therefore, the arising of the above problems is suppressed.

It is assumed that the product I82×R83 of a current value I82 of the constant-current source 82 and a resistance value R83 of the resistor 83 is V0. The current I82 flows through the resistor 83 and a voltage is generated in the resistor 83. V0 indicates this voltage and is lower than the reference voltage Vref_lim1 and the reference voltage Vref_lim2. When the signal fb is higher than the voltage V0, the inverting input terminal of the operational amplifier 80 and one of the non-inverting input terminals of the operational amplifier 80 to which an lower voltage is inputted are virtually short-circuited. By doing so, a current having a value obtained by dividing the lower voltage inputted to the one of the non-inverting input terminals of the operational amplifier 80 by the resistance value R83 of the resistor 83 flows through the resistor 83. The current I82, of this current, is supplied from the constant-current source 82. A current obtained by subtracting the constant current I82 from the current flowing through the resistor 83 flows through the transistor NM1.

The current flowing through the transistor NM1 is returned by the second current mirror circuit made up of the transistor PM1 and the transistor PM3, and a current supplied from the constant-current source 84 is added thereto. A current obtained is a charging current. That is to say, the capacitor 86 is charged via the transistor PM4, which is a switch, with the charging current.

Furthermore, the current flowing through the transistor NM1 is returned by the first current mirror circuit made up of the transistor PM1 and the transistor PM2 and is conducted to the third current mirror circuit made up of the transistor NM2 and the transistor NM3. A current supplied from the constant-current source 85 is added to the current returned by the third current mirror circuit. A current obtained is a discharging current. That is to say, electric charges stored in the capacitor are discharged via the transistor NM4, which is a switch.

A triangular wave voltage generated by charging and discharging the capacitor 86 is compared by the comparator 87 with the upper-limit threshold voltage at the time of the capacitor 86 being charged or the lower-limit threshold voltage at the time of the capacitor 86 being discharged. When the triangular-wave voltage becomes higher than the upper-limit threshold voltage, the comparator 87 outputs an H level signal. When the triangular-wave voltage becomes lower than the lower-limit threshold voltage, the comparator 87 outputs an L level signal. When the comparator 87 outputs the L level signal, the transistor NM5 turns off and the upper-limit threshold voltage generated by the resistors 88 and 89 is inputted to the inverting input terminal of the comparator 87. Furthermore, when the comparator 87 outputs the H level signal, the lower-limit threshold voltage generated by the resistors 88, 89, and 90 is inputted to the inverting input terminal of the comparator 87.

On the other hand, when one of two input voltages to the two non-inverting input terminals of the operational amplifier 80 which is lower than the other (hereinafter simply referred to as "the voltage at the non-inverting input terminal") is lower than the voltage V0, a virtual short circuit of the operational amplifier 80 does not occur. That is to say, when the voltage at the non-inverting input terminal drops, usually an output voltage of the operational amplifier 80, which is a gate voltage of the transistor NM1, also drops, a current flowing through the transistor NM1 decreases, a voltage at the inverting input terminal of the operational amplifier 80 also drops, and a virtual short circuit is maintained. However, the constant current I82 is always supplied from the constant-current source 82 to the resistor 83. Therefore, a voltage at the inverting input terminal of the operational amplifier 80 does not drop below the voltage V0. Accordingly, when the voltage at the non-inverting input terminal drops below the voltage V0, the difference between the voltage at the non-inverting input terminal and the voltage V0 is amplified by the operational amplifier 80 having a large amplification factor and is applied to the gate of the transistor NM1. As a result, the transistor NM1 immediately turns off. A current flowing through the transistor NM1 becomes zero and a current flowing through each of the three current mirror circuits in the oscillator 34 also becomes zero. Accordingly, a charging current and a discharging current of the capacitor 86 are currents supplied only from the constant-current sources 84 and 85 respectively. In a region in which the voltage at the non-inverting input terminal is lower than the voltage V0, a switching frequency Fsw is a constant frequency determined in this way by the currents supplied from the constant-current sources 84 and 85. This region corresponds to a constant frequency (lowest nonzero frequency) region in FIG. 5 or FIG. 6 at the time of the signal fb being small. In FIG. 5 or FIG. 6, a switching frequency Fsw becomes zero in a region in which the signal fb is lower than or equal to the voltage V2 of the reference source V2 and in which an output of the FB comparator 36 is at an H level.

The oscillation cycle of the oscillator 34 is time taken to charge and discharge the capacitor 86 once. As a current flowing through the resistor 83 becomes larger, the oscillation cycle of the oscillator 34 becomes shorter. Therefore, a switching frequency is determined by a current flowing through the resistor 83. As a current flowing through the resistor 83 becomes larger, a switching frequency increases. The maximum value of a current flowing through the resistor 83 is determined by the reference voltage Vref_lim1 or the reference voltage Vref_lim2. As a result, a maximum limit value fswmax of a switching frequency Fsw is determined by the reference voltage Vref_lim1 or the reference voltage Vref_lim2. As these reference voltages rise, the maximum limit value fswmax increases.

The operation of important parts of the switching power supply apparatus will now be described by reference to their operational waveforms.

Figure 7:
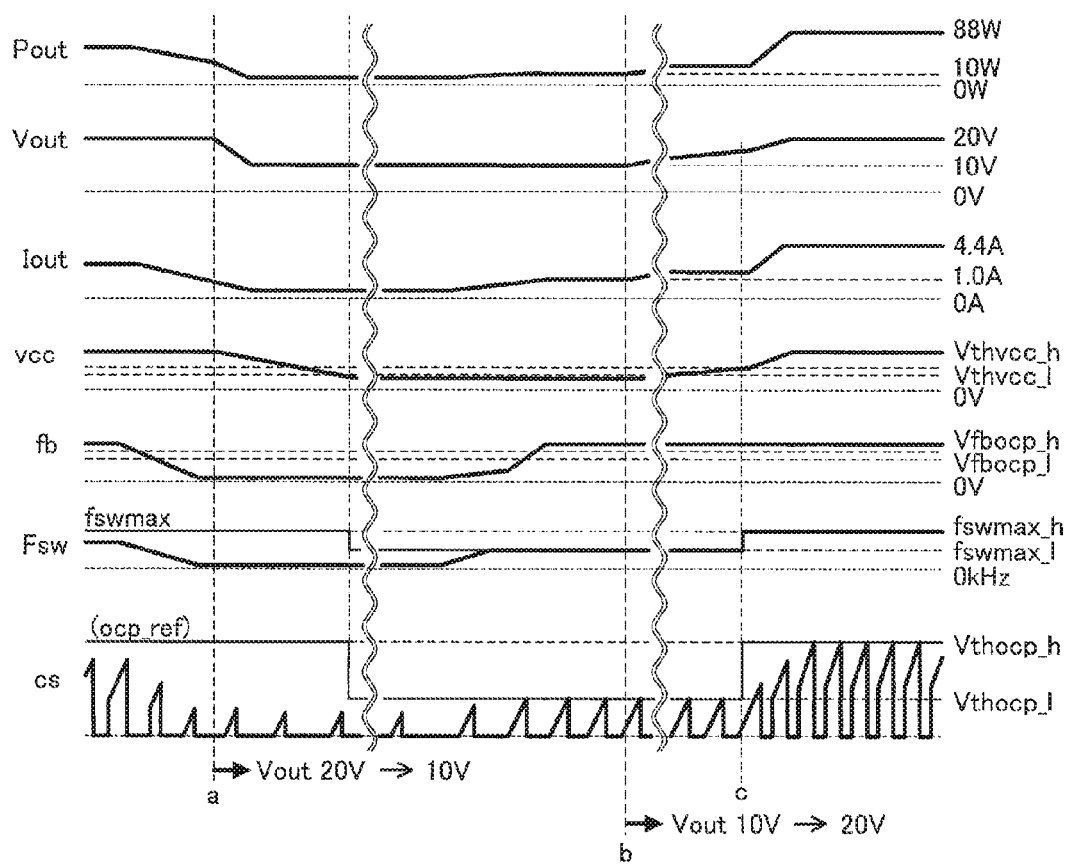
FIG. 7 indicates operational waveforms of important parts of the switching power supply apparatus.
Figure 8:
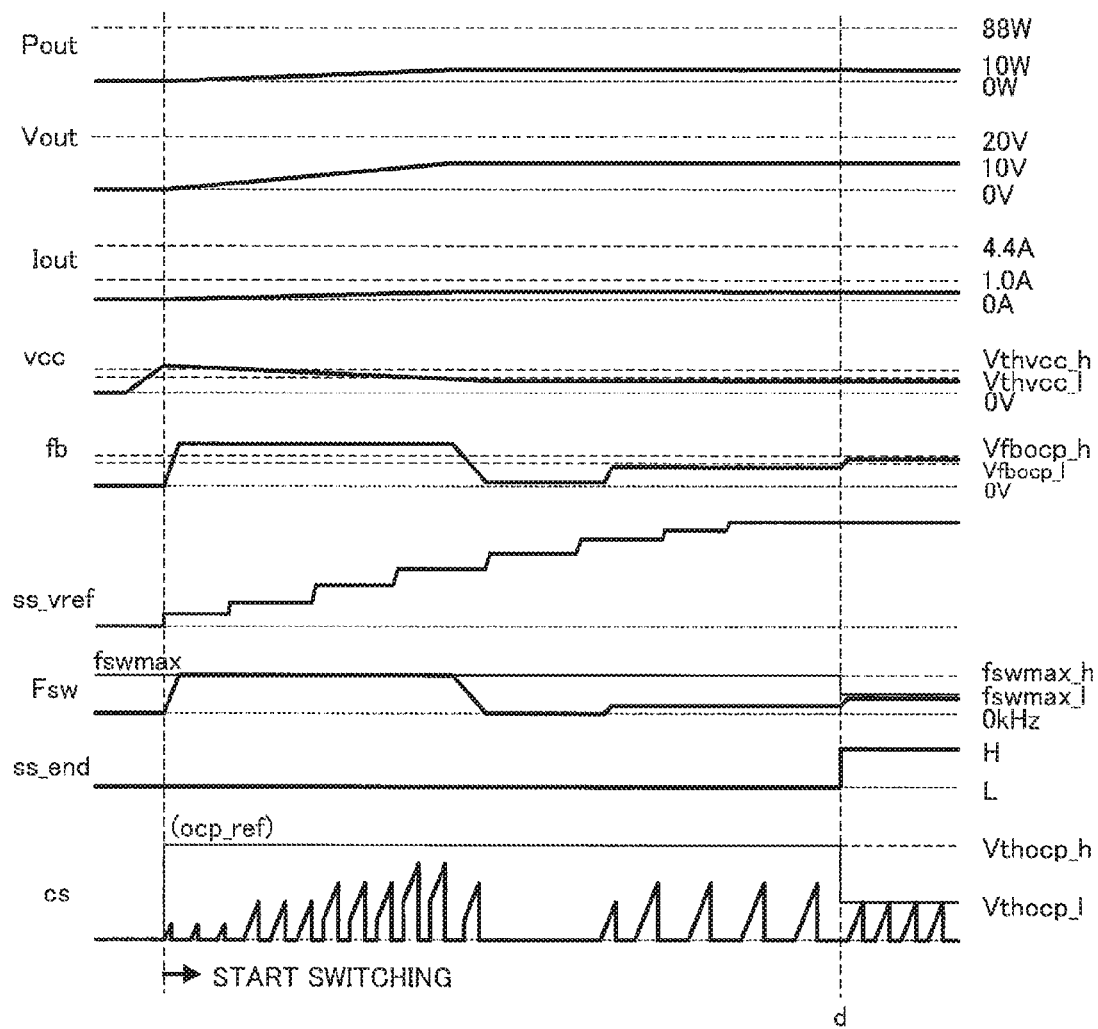
FIG. 8 indicates operational waveforms of important parts of the switching power supply apparatus at start time.

FIG. 7 indicates operational waveforms of important parts of the switching power supply apparatus. FIG. 8 indicates operational waveforms of important parts of the switching power supply apparatus at start time. In FIG. 7, output power Pout, an output voltage Vout, an output current Iout, a voltage vcc at the VCC terminal, a signal fb at the FB terminal, a switching frequency Fsw (frequency at the OUT terminal of the oscillator 34), and a signal cs at the CS terminal are indicated in order from the top. In FIG. 8, output power Pout, an output voltage Vout, an output current Iout, a voltage vcc at the VCC terminal, a signal fb at the FB terminal, a soft start reference voltage ss_vref, a switching frequency Fsw, a soft start end signal ss_end, and a signal cs at the CS terminal of the control IC 8 are indicated in order from the top.

First it is assumed that before time a in FIG. 7, the switching power supply apparatus is controlled by a standby signal supplied from the load so as to output a high output voltage Vout (20 V). At this time a high voltage vcc and the signal fb having a high voltage are inputted to the overcurrent protection control circuit 46. Because the voltage vcc higher than the reference voltage Vthvcc_h, which is a high threshold, is inputted to the comparator 61, the comparator 61 outputs an H-level output signal. Therefore, the comparator 61 compares the voltage vcc and the reference voltage Vthvcc_1. Because the signal fb whose voltage is higher than the reference voltage Vfbocp_h, which is a high threshold, is inputted to the comparator 63, the comparator 63 outputs an H-level output signal. Therefore, the comparator 63 compares the signal fb and the reference voltage Vfbocp_1. At this time, the soft start end signal ss_end is kept at an H level, an L-level signal is inputted to the other input terminal of the OR gate 67, and an H-level signal is inputted to the other input terminal of the AND gate 68.

Because both an output of the comparator 61 and an output of the comparator 63 are at an H level, the RS flip-flop 70 is set and the output terminal Q of the RS flip-flop 70 is at an H level. The overcurrent protection control circuit 46 outputs the signal fsw_limit at an H level to the oscillator 34. As a result, the reference voltage Vref_lim1 is inputted to the second non-inverting input terminal of the operational amplifier 80 in the oscillator 34. A maximum limit value fswmax of a switching frequency Fsw is set to the first maximum switching frequency fswmax_h. Therefore, more power is transmitted from the primary side to the secondary side of the transformer in the switching power supply apparatus.

At this time the signal ocp_ref indicative of an overcurrent limit value is the reference voltage Vthocp_h. The OCP comparator 45 compares the signal cs with the reference voltage Vthocp_h.

The switching power supply apparatus is switched at the time a so as to output a low output voltage Vout (10 V). At this time the output power Pout and the output current Iout have already dropped. Therefore, the signal fb has dropped below the reference voltage Vfbocp_1. As a result, the comparator 63 outputs an L-level signal and sets a threshold with which the signal fb is compared to the reference voltage Vfbocp_h. Furthermore, as the output voltage Vout drops, the voltage vcc also drops.

When the voltage vcc drops below the reference voltage Vthvcc_1, the comparator 61 outputs an L-level signal and sets a threshold with which the voltage vcc is compared to the reference voltage Vthvcc_h. Because both an output of the comparator 61 and an output of the comparator 63 are at an L level, the RS flip-flop 70 is reset and the output terminal Q of the RS flip-flop 70 is at an L level. The overcurrent protection control circuit 46 outputs the signal fsw_limit at an L level to the oscillator 34. As a result, the reference voltage Vref_lim2 is inputted to the second non-inverting input terminal of the operational amplifier 80 in the oscillator 34. A maximum limit value fswmax of a switching frequency Fsw is switched to the second maximum switching frequency fswmax_1 lower than the first maximum switching frequency fswmax_h.

At this time the signal ocp_ref indicative of an overcurrent limit value is switched from the reference voltage Vthocp_h to the reference voltage Vthocp_1 lower than the reference voltage Vthocp_h. The OCP comparator 45 compares the signal cs with the reference voltage Vthocp_1.

When the load is ending a standby state, the voltage vcc remains low. However, as the output current Iout increases, the signal fb soon rises and exceeds the reference voltage Vfbocp_h. As a result, a state in which the comparator 61 outputs an L-level signal and in which the comparator 63 outputs an H-level signal arises. However, the signal fsw_limit and the signal ocp_ref outputted from the overcurrent protection control circuit 46 do not change. That is to say, the signal fsw_limit indicative of a maximum limit value fswmax of a maximum switching frequency remains at an H level and the signal ocp_ref indicative of an overcurrent limit value remains at the reference voltage Vthocp_1.

The switching power supply apparatus is then switched at time b so as to output a high output voltage Vout (20 V). When control is began for increasing the output voltage Vout, the voltage vcc rises.

The voltage vcc exceeds the reference voltage Vthvcc_h at time c. At this time, an output of the comparator 61 is switched to an H level and the overcurrent protection control circuit 46 outputs the signal fsw_limit at an H level. As a result, the oscillator 34 switches a maximum limit value fswmax of a maximum switching frequency to the first maximum switching frequency fswmax_h. An overcurrent limit value of the OCP comparator 45 is switched to the reference voltage Vthocp_h.

As has been described, for a period for which an output of the switching power supply apparatus is set to a low output voltage, a maximum limit value fswmax of a maximum switching frequency is switched to the second maximum switching frequency fswmax_1, which is a lower value, and an overcurrent limit value is switched to the reference voltage Vthocp_1, which is a lower value. As a result, in the example of FIG. 7, the output power Pout is reduced from 88 W, which is the maximum power, to 10 W and the output current Iout is also reduced from 4.4 A, which is the maximum output current, to 1 A.

When an output of the switching power supply apparatus is set to a high output voltage, a maximum limit value fswmax of a maximum switching frequency is switched to the first maximum switching frequency fswmax_h, which is a higher value, and an overcurrent limit value is switched to the reference voltage Vthocp_h, which is a higher value. As a result, in the example of FIG. 7, the output power Pout may be increased up to 88 W, which is the maximum power, and the output current Iout may also be increased up to 4.4 A, which is the maximum output current.

Operation at the time of the switching power supply apparatus starting switching will now be described. As indicated in FIG. 8, when the switching power supply apparatus starts switching, both of the voltage vcc and the voltage of the signal fb may start at 0 V and each of an overcurrent limit value and a maximum switching frequency may start at a lower set value. In this case, output power is low. As a result, the rising of the output voltage Vout is slow. In order to avoid this, the soft start end signal ss_end which becomes an H level after the end of a soft start or after the elapse of a certain time from a soft start is used.

The soft start end signal ss_end is outputted from the soft start circuit 48 and is inputted to the overcurrent protection control circuit 46. While the soft start end signal ss_end is at an L level, the overcurrent protection control circuit 46 forcedly puts the RS flip-flop 70 into a set state by the OR gate 67, the AND gate 68, and the NOT gate 69. As a result, a maximum limit value fswmax of a maximum switching frequency is set to the first maximum switching frequency fswmax_h and the signal ocp_ref indicative of an overcurrent limit value is set to the reference voltage Vthocp_h. While the soft start end signal ss_end is at the L level, a maximum limit value fswmax of a switching frequency Fsw does not change to the second maximum switching frequency fswmax_1 and the signal ocp_ref does not change to the reference voltage Vthocp_1.

The soft start end signal ss_end becomes an H level at time d. At this time the RS flip-flop 70 operates by signals from the AND gate 65 and the NOR gate 66. Because at this time the switching power supply apparatus is controlled by a standby signal supplied from the load so as to output a low output voltage Vout (10 V), the voltage vcc is low. As a result, an output of the comparator 61 is at an L level. Furthermore, power is supplied to a certain extent to the load during a soft start period. Accordingly, the signal fb is small and an output of the comparator 63 is at an L level. As a result, the RS flip-flop 70 is reset.

As has been described, when the soft start end signal ss_end becomes an H level and the switching power supply apparatus starts, a start is always made from the higher overcurrent limit value (Vthocp_h) and the higher maximum switching frequency (fswmax_h). In addition, an overcurrent limit value or a maximum switching frequency is not switched to the lower overcurrent limit value or the lower maximum switching frequency during a soft start period of the switching power supply apparatus or for a certain time after the start of the switching power supply apparatus. This prevents the rising of the output voltage Vout at start time from becoming slow.

When an output voltage of the switching power supply apparatus having the above structure is switched to a second output voltage lower than a first output voltage, an overcurrent limit value is set to a lower second overcurrent limit value. This has the following advantage. An overcurrent limit value of a switching element is set to a low value and an increase in output current is suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply apparatus that generates an output DC voltage on a secondary winding side of a transformer by performing switching of a switching element connected to a primary winding of the transformer and that exercises control so as to make the output voltage constant by feeding back an output voltage signal corresponding to the generated output voltage to a primary side of the transformer, the switching power supply apparatus comprising:
an oscillation circuit which generates a signal for performing switching of the switching element;
an output voltage switching circuit which switches the output voltage selectively between a first output voltage or a second output voltage lower than the first output voltage by handling the output voltage signal; and
an overcurrent protection circuit which limits a principal current flowing through the switching element to an overcurrent limit value, wherein:
the overcurrent protection circuit sets the overcurrent limit value to a first overcurrent limit value at the time of the output voltage being switched to the first output voltage and sets the overcurrent limit value to a second overcurrent limit value lower than the first overcurrent limit value at the time of the output voltage being switched to the second output voltage, and
the oscillation circuit sets a maximum limit value of a switching frequency to a first maximum switching frequency at the time of the overcurrent limit value being the first overcurrent limit value and sets the maximum limit value of the switching frequency to a second maximum switching frequency lower than the first maximum switching frequency at the time of the overcurrent limit value being the second overcurrent limit value.

2. The switching power supply apparatus according to claim 1, wherein switching of the output voltage selectively between the first output voltage or the second output voltage is determined by comparing a source voltage generated from a voltage supplied from an auxiliary winding of the transformer with a first threshold.

3. The switching power supply apparatus according to claim 2, wherein:
the overcurrent limit value is switched to the first overcurrent limit value under conditions that the source voltage is higher than or equal to the first threshold and the output voltage signal is higher than or equal to a second threshold, and
the overcurrent limit value is switched to the second overcurrent limit value under conditions that the source voltage is lower than the first threshold and the output voltage signal is lower than the second threshold.

4. The switching power supply apparatus according to claim 1, wherein during a soft start period at start time or for a certain time from a start, the maximum limit value of the switching frequency is set to the first maximum switching frequency and the overcurrent limit value is set to the first overcurrent limit value.

5. The switching power supply apparatus according to claim 1, wherein the overcurrent protection circuit includes:
an overcurrent protection control circuit which receives a source voltage generated from a voltage supplied from an auxiliary winding of the transformer and the output voltage signal and which outputs the overcurrent limit value and a switching signal for switching the maximum limit value to the first maximum switching frequency or the second maximum switching frequency; and
an overcurrent protection comparator which compares a detection signal of the principal current flowing through the switching element and the overcurrent limit value.

6. The switching power supply apparatus according to claim 5, wherein the oscillation circuit includes a reference voltage switching switch which receives the switching signal from the overcurrent protection control circuit and which performs switching to a first reference voltage or a second reference voltage for setting the maximum limit value of the switching frequency to the first maximum switching frequency or the second maximum switching frequency.

7. The switching power supply apparatus according to claim 5, wherein:
the overcurrent protection control circuit includes:
a first hysteresis comparator which compares the source voltage generated from the voltage supplied from the auxiliary winding of the transformer with a first threshold;
a second hysteresis comparator which compares the output voltage signal with a second threshold;
a first AND gate which receives an output of the first hysteresis comparator and an output of the second hysteresis comparator;
a NOR gate which receives the output of the first hysteresis comparator and the output of the second hysteresis comparator; and
an RS flip-flop which receives an output of the first AND gate at a set terminal, which receives an output of the NOR gate at a reset terminal, and which outputs the switching signal from an output terminal, and
wherein the first overcurrent limit value or the second overcurrent limit value is selected according to an output state of the RS flip-flop.

8. The switching power supply apparatus according to claim 7, wherein
the overcurrent protection control circuit further includes:
a NOT gate which receives a soft start end signal indicative of the elapse of a soft start period at start time or the elapse of a certain period from a start;
an OR gate which receives the output of the first AND gate and an output of the NOT gate and which connects an output to the set terminal of the RS flip-flop; and
a second AND gate which receives the output of the NOR gate and the soft start end signal and which connects an output to the reset terminal of the RS flip-flop.

9. A switching power supply apparatus that generates an output DC voltage on a secondary winding side of a transformer by performing switching of a switching element connected to a primary winding of the transformer, and that exercises control so as to make the output voltage constant by feeding back an output voltage signal corresponding to the generated output voltage to a primary side of the transformer, the switching power supply apparatus comprising:
an oscillation circuit which generates a signal for performing switching of the switching element;
an output voltage switching circuit which selectively switches the output voltage between a first output voltage or a second output voltage lower than the first output voltage by handling the output voltage signal; and
an overcurrent protection circuit which selectively limits a principal current flowing through the switching element to a first overcurrent limit value or a second overcurrent limit value lower than the first overcurrent limit value,
wherein:
when a source voltage is lower than a first threshold and the output voltage signal is lower than a second threshold, the overcurrent protection circuit avoids switching an overcurrent limit value from the second overcurrent limit value to the first overcurrent limit value, and
when the source voltage is higher than or equal to the first threshold and the output voltage signal is higher than or equal to the second threshold, the overcurrent protection circuit avoids switching the overcurrent limit value from the first overcurrent limit value to the second overcurrent limit value.

10. The switching power supply apparatus according to claim 9, wherein switching of the output voltage between the first output voltage or the second output voltage is determined by comparing the source voltage generated from a voltage supplied from an auxiliary winding of the transformer with the first threshold.

* * * * *